(12) United States Patent
Morlacchi

(10) Patent No.: US 11,046,065 B2
(45) Date of Patent: Jun. 29, 2021

(54) MEMBRANE LAMINATION OF THREE-DIMENSIONAL (3D) ARTICLE

(71) Applicant: OutDry Technologies Corporation, Portland, OR (US)

(72) Inventor: Matteo Morlacchi, Portland, OR (US)

(73) Assignee: Outdry Technologies Corporation, Portland, OR (US)

( * ) Notice: Subject to any disclaimer, the term of this patent is extended or adjusted under 35 U.S.C. 154(b) by 0 days.

(21) Appl. No.: 16/258,895

(22) Filed: Jan. 28, 2019

(65) Prior Publication Data

US 2019/0152191 A1 May 23, 2019

Related U.S. Application Data

(62) Division of application No. 14/883,995, filed on Oct. 15, 2015, now Pat. No. 10,661,543.
(Continued)

(51) Int. Cl.
*B32B 37/06* (2006.01)
*B32B 7/05* (2019.01)
(Continued)

(52) U.S. Cl.
CPC ............ *B32B 37/06* (2013.01); *A43B 23/022* (2013.01); *A43B 23/0255* (2013.01); *A43D 3/04* (2013.01);
(Continued)

(58) Field of Classification Search
CPC ............ B32B 37/1207; B32B 37/1215; B32B 37/1223; B32B 37/123; B32B 37/06;
(Continued)

(56) References Cited

U.S. PATENT DOCUMENTS 2,284,232 A * 5/1942 Richa ...................... D06F 71/18
223/57
2,460,732 A * 2/1949 Brenner .................. D06F 73/00
223/67
(Continued)

FOREIGN PATENT DOCUMENTS

CN 102497997 6/2012
EP 0096080 A1 * 12/1983 ............. D06F 73/00
(Continued)

OTHER PUBLICATIONS

Quanzhou Xieli Mould Co., Ltd., Website, PVC Air Blowing Shoe Mould, http://www.shoe-mould.com/2-pvc-air-blowing-shoe-mould.html.
(Continued)

*Primary Examiner* — John L Goff, II
(74) *Attorney, Agent, or Firm* — Schwabe Williamson & Wyatt, P.C.

(57) ABSTRACT

Embodiments provide a lamination machine and lamination process for laminating a membrane to a three-dimensional (3D) target surface of an article, such as a footwear article, glove, clothing article, backpack, or other article. The lamination machine may include an inflatable former that is permeable to air. The inflatable former may have a shape that generally corresponds to a shape of the target surface. The membrane and target surface may be arranged on the former, with a heat-activated adhesive disposed between the membrane and the target surface. The lamination machine may further include a pump to pump heated compressed air into the former. The heated compressed air may inflate the former to press the membrane against the target surface and to activate the adhesive to bond the membrane to the target surface.

12 Claims, 11 Drawing Sheets

Related U.S. Application Data

(60) Provisional application No. 62/064,804, filed on Oct. 16, 2014.

(51) Int. Cl.
| | | |
|---|---|---|
| *A43B 23/02* | (2006.01) | |
| *A43D 3/04* | (2006.01) | |
| *A43D 25/20* | (2006.01) | |
| *B32B 5/02* | (2006.01) | |
| *B32B 5/24* | (2006.01) | |
| *B32B 27/06* | (2006.01) | |
| *B32B 27/28* | (2006.01) | |
| *B32B 37/10* | (2006.01) | |
| *B32B 37/18* | (2006.01) | |
| *B32B 7/14* | (2006.01) | |
| *B32B 37/12* | (2006.01) | |

(52) U.S. Cl.
CPC ............... *A43D 25/20* (2013.01); *B32B 5/02* (2013.01); *B32B 5/026* (2013.01); *B32B 5/24* (2013.01); *B32B 7/05* (2019.01); *B32B 7/14* (2013.01); *B32B 27/06* (2013.01); *B32B 27/283* (2013.01); *B32B 37/10* (2013.01); *B32B 37/1018* (2013.01); *B32B 37/1207* (2013.01); *B32B 37/18* (2013.01); *B32B 2255/02* (2013.01); *B32B 2255/26* (2013.01); *B32B 2262/0261* (2013.01); *B32B 2262/0269* (2013.01); *B32B 2262/106* (2013.01); *B32B 2307/50* (2013.01); *B32B 2307/546* (2013.01); *B32B 2307/554* (2013.01); *B32B 2307/724* (2013.01); *B32B 2307/7265* (2013.01); *B32B 2309/04* (2013.01); *B32B 2437/00* (2013.01); *B32B 2437/02* (2013.01)

(58) Field of Classification Search
CPC ............... B32B 37/10; B32B 37/1009; B32B 2307/1072; B32B 5/02; B32B 5/026; B32B 5/24; B32B 7/05; B32B 7/14; B32B 27/06; B32B 27/283; B32B 37/1018; B32B 37/18; B32B 38/1866; B32B 41/00; B32B 2255/02; B32B 2255/26; B32B 2262/0261; B32B 2262/0269; B32B 2262/106; B32B 2307/50; B32B 2307/546; B32B 2307/554; B32B 2307/724; B32B 2307/7265; B32B 2309/04; B32B 2437/00; B32B 2437/02; A43B 23/0255; A43B 23/022; B29C 65/10; B29C 66/634; B29C 66/632; B29C 66/81455; B29C 49/44; B29C 2049/4638; B29C 53/825; B29C 73/34; B29C 51/28; B29C 66/494; B29C 73/32; B29C 63/30; B29C 63/0073; B29C 63/0065; B29C 63/28; A43D 25/20; A43D 3/04; D06F 73/00; D06F 59/02

See application file for complete search history.

(56) References Cited

U.S. PATENT DOCUMENTS

| | | | |
|---|---|---|---|
| 2,803,889 A * | 8/1957 | Ushakoff | D06C 7/00 34/143 |
| 2,907,074 A | 10/1959 | Rhodes | |
| 2,986,311 A * | 5/1961 | Stiefel | D06F 71/26 223/57 |
| 3,298,578 A * | 1/1967 | Rhea | D06F 73/00 223/67 |
| 3,421,668 A * | 1/1969 | Strike | D06F 71/295 223/73 |
| 4,135,033 A | 1/1979 | Lawton | |
| 4,347,205 A | 8/1982 | Stewart | |
| 4,728,015 A | 3/1988 | Holzapfel et al. | |
| 4,780,262 A | 10/1988 | Vonvolkli | |
| 5,244,716 A | 9/1993 | Thorton et al. | |
| 5,667,738 A | 9/1997 | Krajcir | |
| 5,685,091 A | 11/1997 | Yalamanchili | |
| 5,713,141 A | 2/1998 | Mitchell et al. | |
| 5,874,151 A | 2/1999 | Cohee et al. | |
| 6,108,844 A * | 8/2000 | Kraft | A47C 27/087 5/732 |
| 7,229,518 B1 | 6/2007 | Watkins et al. | |
| 7,803,438 B2 | 9/2010 | Flather et al. | |
| 7,959,758 B2 | 6/2011 | Flather et al. | |
| 8,470,121 B2 | 6/2013 | Reuvekamp et al. | |
| 8,578,534 B2 | 11/2013 | Langvin et al. | |
| 2006/0005424 A1 | 1/2006 | Laska | |
| 2009/0145936 A1* | 6/2009 | Convents | D06F 73/00 223/67 |
| 2010/0018636 A1 | 1/2010 | Ostani | |
| 2010/0139850 A1 | 6/2010 | Morris | |
| 2011/0003158 A1 | 1/2011 | Flather et al. | |
| 2011/0192537 A1 | 8/2011 | Langvin et al. | |
| 2011/0258750 A1 | 10/2011 | Hayashi et al. | |
| 2011/0277025 A1 | 11/2011 | Langvin et al. | |
| 2012/0196115 A1 | 8/2012 | Choe et al. | |
| 2014/0134378 A1 | 5/2014 | Downs et al. | |

FOREIGN PATENT DOCUMENTS

| | | |
|---|---|---|
| EP | 1139805 | 10/2008 |
| FR | 2785032 | 4/2000 |
| GB | 801393 | 9/1958 |
| JP | 2006181211 | 7/2006 |
| WO | 2010/107297 | 9/2010 |
| WO | 2014167288 | 10/2014 |

OTHER PUBLICATIONS

DIYTrade International, Website, PVC Inflatable Shoe Mold, Copyright 2015, http://www.diytrade.com/china/pd/6316537/PVC_inflatable_shoe_mold.html.

Alibaba Manufacturing, Website, Plastc inflatable boot shapers, inflatable shoe insert inflatable shoe shaper for boot, Copyright 2015, http://www.alibaba.com/product-detail/Plastc-inflatable-boot-shapers-inflatable-shoe_1339000062.html?spm=a2700.7724838.30.95.OXJ6RJ.

* cited by examiner

MEMBRANE LAMINATION OF THREE-DIMENSIONAL (3D) ARTICLE

CROSS REFERENCE TO RELATED APPLICATIONS

The present application claims priority to U.S. patent application Ser. No. 14/883,995, filed Oct. 15, 2015, now U.S. Pat. No. 10,661,543, entitled "Membrane Lamination of Three-Dimensional (3D) Article," which claims priority to U.S. Provisional Patent Application No. 62/064,804, filed Oct. 16, 2014, entitled "Membrane Lamination of Three-Dimensional (3D) Article," the entire disclosures of which are hereby incorporated by reference in their entirety.

TECHNICAL FIELD

Embodiments herein relate to the field of manufacturing, and, more specifically, to a process and machine for membrane lamination.

BACKGROUND

In many articles, such as footwear, clothing, backpacks, and/or bags, a membrane is laminated to the article to provide protection and/or other functions. For example, many articles include a waterproof membrane laminated to a fabric to provide protection from liquids and/or other substances. However, it can be difficult to laminate the membrane to the fabric with even adhesion and/or in an efficient manner.

BRIEF DESCRIPTION OF THE DRAWINGS

Embodiments will be readily understood by the following detailed description in conjunction with the accompanying drawings and the appended claims. Embodiments are illustrated by way of example and not by way of limitation in the figures of the accompanying drawings.

DETAILED DESCRIPTION OF DISCLOSED EMBODIMENTS

Figure 1A:
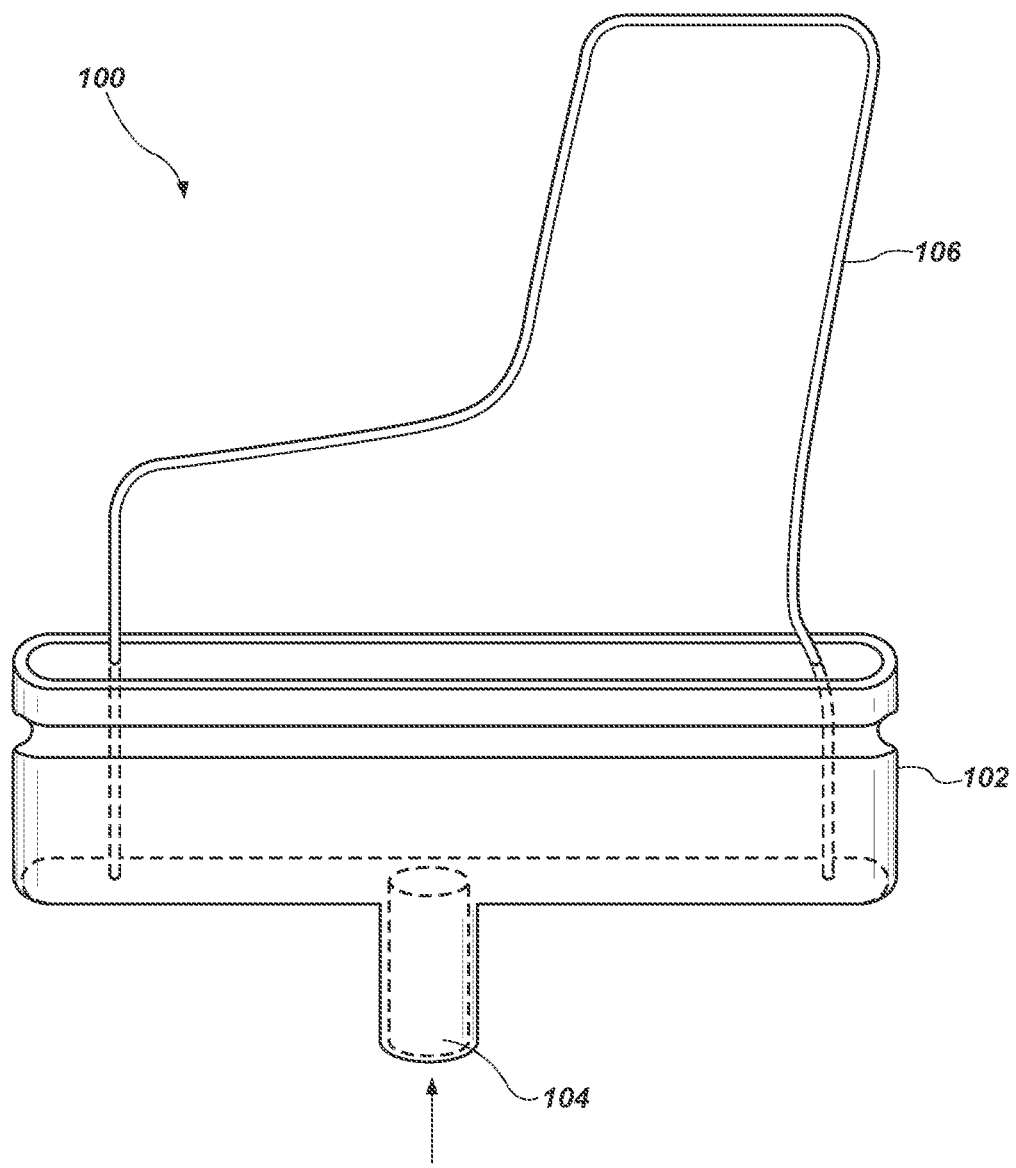
FIG. 1A illustrates a lamination machine including a tray and a frame in accordance with various embodiments.

In the following detailed description, reference is made to the accompanying drawings which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Various operations may be described as multiple discrete operations in turn, in a manner that may be helpful in understanding embodiments; however, the order of description should not be construed to imply that these operations are order dependent.

The description may use perspective-based descriptions such as up/down, back/front, and top/bottom. Such descriptions are merely used to facilitate the discussion and are not intended to restrict the application of disclosed embodiments.

The terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the terms "embodiment" or "embodiments," which may each refer to one or more of the same or different embodiments. Furthermore, the terms "comprising," "including," "having," and the like, as used with respect to embodiments, are synonymous, and are generally intended as "open" terms (e.g., the term "including" should be interpreted as "including but not limited to," the term "having" should be interpreted as "having at least," the term "includes" should be interpreted as "includes but is not limited to," etc.).

With respect to the use of any plural and/or singular terms herein, those having skill in the art can translate from the plural to the singular and/or from the singular to the plural as is appropriate to the context and/or application. The various singular/plural permutations may be expressly set forth herein for sake of clarity.

Embodiments herein provide a lamination machine and lamination process for laminating a membrane to a three-dimensional (3D) body of an article, such as a footwear article (e.g., shoe), clothing article (e.g., glove, jacket, pants), backpack, and/or a bag. Although the lamination machine is discussed herein with reference to a shoe, it will be apparent that the lamination machine and/or lamination process may be used to laminate a membrane to any suitable type of article. The lamination machine and process may generally be used to laminate the membrane to the body of the article when the body has a 3D shape.

In various embodiments, the membrane may be waterproof and/or may have one or more other suitable characteristics. The membrane may or may not also be breathable.

In various embodiments, the lamination machine may include an inflatable former. The membrane and the body of the article may be placed on the inflatable former such that the inflatable former resides, during lamination, at least partially in an internal portion of the article. An adhesive may be disposed between the membrane and the inside surface of the article to adhere the membrane to the article. In some embodiments, the adhesive may be heat-activated.

In various embodiments, the former may include a primary opening/inlet through which a gas, such as air, may be pumped to inflate the former. In some embodiments, the gas may be heated.

In various embodiments, the former may have a shape that generally corresponds to a shape of a target surface to which the membrane is to be laminated (e.g., an inner surface of the body of the article). In some embodiments, the former may be larger in its fully inflated state than the shape of the target surface. Accordingly, the former may apply pressure to the target surface when the former is inflated. The former may conform to the inner surface of the article and provide substantially even pressure across the target surface of the article, thereby facilitating uniform adhesion of the membrane to the body of the article.

In various embodiments, the former may be made of a flexible material that is permeable to air, such as a fabric. The former may be made of silicone or may be made from a silicone coating on an underlying fabric layer. Other coatings may be used instead of silicone. In an embodiment, a former can be constructed from multiple pieces assembled by stitching, welding, etc. In embodiments, a former can be molded or formed in a single 3D shape.

In addition, or alternatively, the former may be perforated to impart or enhance air permeability. Perforations may be provided across the entire former, or they may be located only in certain specified regions, such as the regions that are intended to contact the inner surface of the article. The term "perforation" refers to a hole, slit, or other opening formed in the former material. Perforations may be formed by any suitable method, such as using a mechanical press or punch, a laser, etc. An example perforation may have a diameter of 0.1 mm to 1.0 mm. If the perforation is not circular, the term "diameter" may be used to refer to the long dimension of the perforation.

The former material may have a permeability to air/gas of about 1 to 120 millimeter/second (mm/sec), preferably from 5 to 80 mm/sec, according to the ISO 9237:1995 test method for air permeability of textile fabrics (tested at 200 Pa pressure, 20 cm$^2$ area, 60 sec). The permeability of the former may allow some of the heated gas to pass through the former, thereby heating (e.g., via convection) the adhesive to activate the adhesive. Additional air may be pumped into the former (e.g., continuously) to keep the former inflated maintaining the desired pressure and providing the desired temperature. The heated gas may also heat the former material, which may in turn heat the adhesive via conduction.

Air permeability of a former may be uniform across the entire former, or permeability may vary depending on the location/region of the former based on the presence/absence of perforations, the size and number of perforations, etc.

In some embodiments, the hot air may have a temperature of, for example, about 60 degrees Celsius to about 200 degrees Celsius. The heat applied to the adhesive may activate the adhesive (e.g., turn the adhesive into a liquid state).

In some embodiments, the heated air may be pumped into the former under pressure, such as a pressure of 30 pounds per square inch or more. In embodiments, the pressure inside the former may be maintained at a pressure of 60-100 KPa, such as 80 KPa (0.81 bar).

In embodiments, the heated air may be pumped into the former (e.g., by a pump) for a heating time period. The heating time period may be, for example, about 15 seconds to about 2 minutes. During the heating time period, the air may be pumped into the former under a constant pressure. Alternatively, the air may be pumped into the former at a first pressure for a first time period followed by an increased pressure for a second time period.

After the heating time period, the pump may lower the temperature of the air pumped into the former. The pump may pump cold air for a cooling time period. The cold air may have a temperature that is colder than the temperature of the hot air that is pumped into the former during the heating time period. For example, the cold air may have a temperature of about 10 degrees Celsius to about 50 degrees Celsius. In some embodiments, the cooling time period may be about 10 seconds to about 1 minute. The cold air pumped into the former during the cooling time period may cool the adhesive to cure the adhesive. The adhesive may convert from a liquid to a solid and may adhere the membrane to the target surface.

After the cooling time period, the pump may stop pumping gas into the former. The former may deflate to facilitate removal of the article from the former. In some embodiments, a vacuum may remove air from the former after the cooling time.

In some embodiments, the lamination machine may further include a tray (e.g., a plug) disposed in the opening of the former. The tray may include an inlet through which air may be pumped into the former by the pump. A tube may couple the pump to the inlet to pass air from the pump into the former.

In some embodiments, the lamination machine may further include a rigid frame coupled to the tray. The rigid frame may provide structural support for the former, the membrane, and/or the article to allow the membrane and article to be arranged on the former when the former is not inflated.

In some embodiments, a collar may be coupled around the tray, with the former disposed between the collar and the tray, to secure the former to the tray.

In some embodiments, the lamination machine may further include an outer cover that may be placed external and adjacent to the article after the article is placed on the former. The outer cover may be a rigid shell or a pliable material, such as a fabric.

An outer cover constructed from a rigid shell may have an inner surface with a shape that generally corresponds to the shape of the outer surface of the article. The rigid shell may prevent the article from expanding significantly from the gas that is pumped into the former. The shell may cover at least a portion (e.g., a portion or all) of the outer surface of the article. In some embodiments, the shell may include one or more openings to allow passage of the pumped gas through the shell. In some embodiments, the shell may include two plates that are coupled to one another (e.g., in a clamshell arrangement) to be selectively closed around the article while the article is disposed on the former.

An outer cover constructed from a pliable material may be a generally non-stretchable fabric or similar material such that it surrounds all or a portion of the article, but has minimal flex. In some embodiments, the outer cover is configured to permit some air to escape from one or more main openings at the bottom or top of the cover, and/or through the material itself. Suitable pliable materials include rigid fiber structures, nylon, KEVLAR, carbon fiber, etc.

When the former is inflated, the placement of an outer cover around the article provides counter pressure against the outward movement of the article in response to the inflation of the former. The outer cover also contains expansion of the former and thus prevents undesired article deformation during lamination. The outer cover may be secured around the article using a collar (strap, cord, snaps, etc.).

In some embodiments, the adhesive may be pre-applied to and/or integrated with the membrane. In other embodiments, the adhesive may be applied to the membrane and/or the inside surface of the article during the lamination process. The adhesive may form a continuous layer on the membrane and/or may be arranged in a pattern, such as a dot-matrix, in rows, and/or in another orientation/configuration. The use of a patterned adhesive avoids complete occlusion of the membrane and thus assists in maintaining the breathability of the membrane.

In some embodiments, one or more additional layers and/or materials may be included in the membrane. For example, the membrane may include a waterproof layer, a heat-activated adhesive, and a protective layer. In some embodiments, the adhesive may be disposed on a first side of the waterproof layer, and the protective layer may be disposed on a second side of the waterproof layer. The protective layer may protect the waterproof layer from abrasion. The protective layer may include any suitable material, such as monofilament nylon knit (e.g., 2-denier half tricot). Monofilament nylon knit has high resistance to abrasion and low wicking of moisture (e.g., to avoid water being wicked into other layers of the article).

In some embodiments, prior to mating the membrane with the article, the membrane may be formed in a three dimensional conformation corresponding to the shape of the target surface (e.g., the inside surface) of the article. For example, the membrane may be formed by one or more panels coupled together (e.g., by stitching, adhesive, and/or tape sealing). In some embodiments, the panels may overlap at the edges with the adjoining panel. The panels may overlap with the adhesive layer of one panel against the adhesive layer of the adjoining panel, or with the adhesive layer of one panel against the protective layer of the adjoining panel.

The membrane may then be placed against the target surface of the article. In some embodiments, the membrane may be placed on the former (e.g., supported by the frame of the lamination machine), and then the article may be placed over the membrane and arranged in the desired orientation. In other embodiments, the membrane may be arranged in the desired orientation against the target surface of the body of the article prior to placing the membrane and the body of the article on the former.

FIGS. 1A, 1B, 1C, and 1D illustrate a lamination machine 100 at different points of a lamination process. As best seen in FIG. 1A, the lamination machine 100 includes a tray 102 with an inlet 104. The inlet 104 may be coupled to a pump (e.g., by a tube) to receive compressed gas (e.g., air). The tray may be made of any suitable material, such as aluminum and/or steel.

The lamination machine 100 further includes a frame 106 coupled to the tray 102. The frame 106 may be rigid, and may be made of any suitable material, such as steel and/or rigid wire. The frame 106 may provide support to a former, membrane, and/or body of an article, as discussed further below.

Figure 1B:
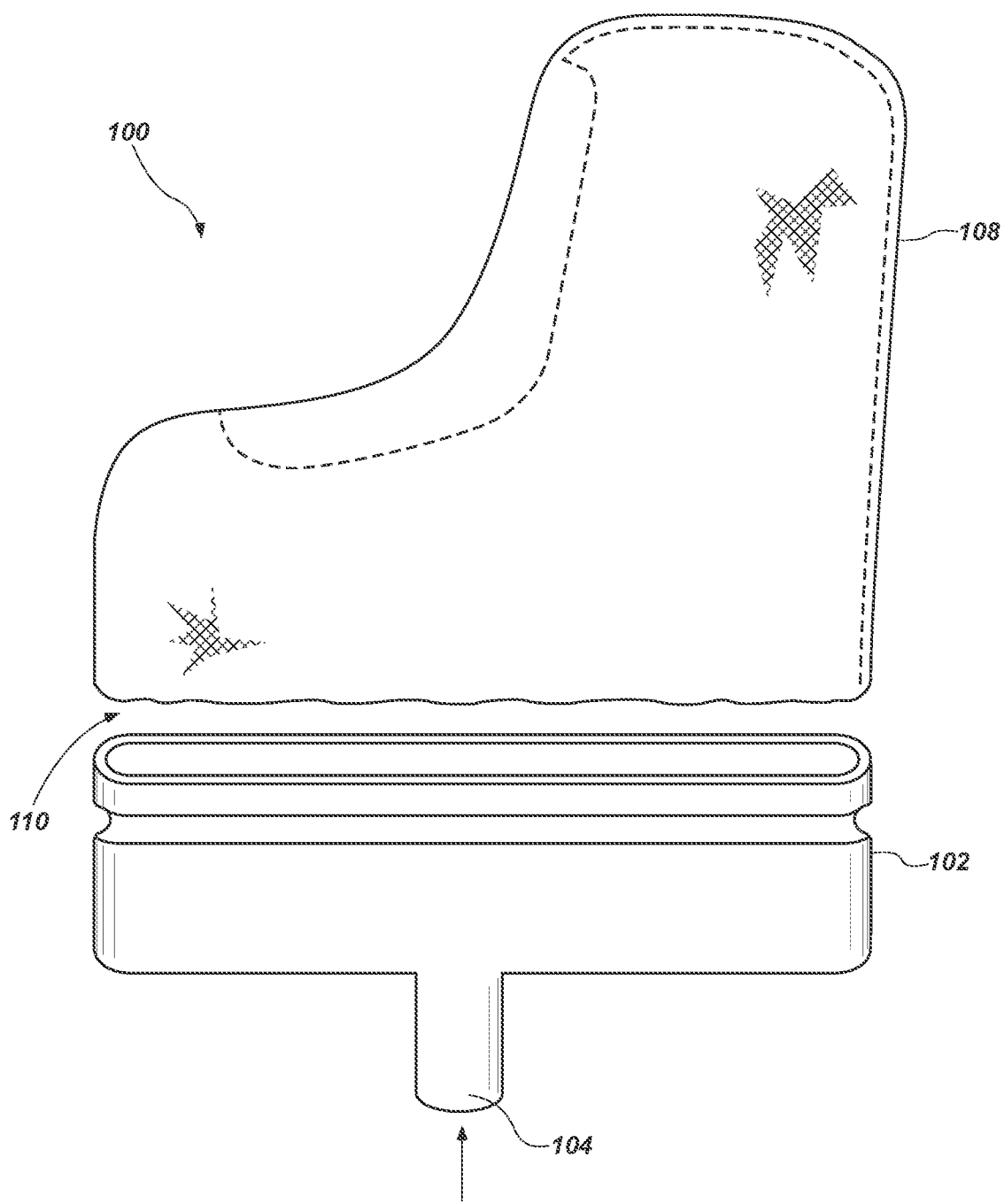
FIG. 1B illustrates the lamination machine of FIG. 1A with an inflatable former in accordance with various embodiments.

As shown in FIG. 1B, the lamination machine 100 may include an inflatable former 108 with an opening 110. The former 108 may be made of a material that is permeable to air. In some embodiments, the former 108 may further include one or more perforations (not shown) to let air pass through.

Figure 1C:
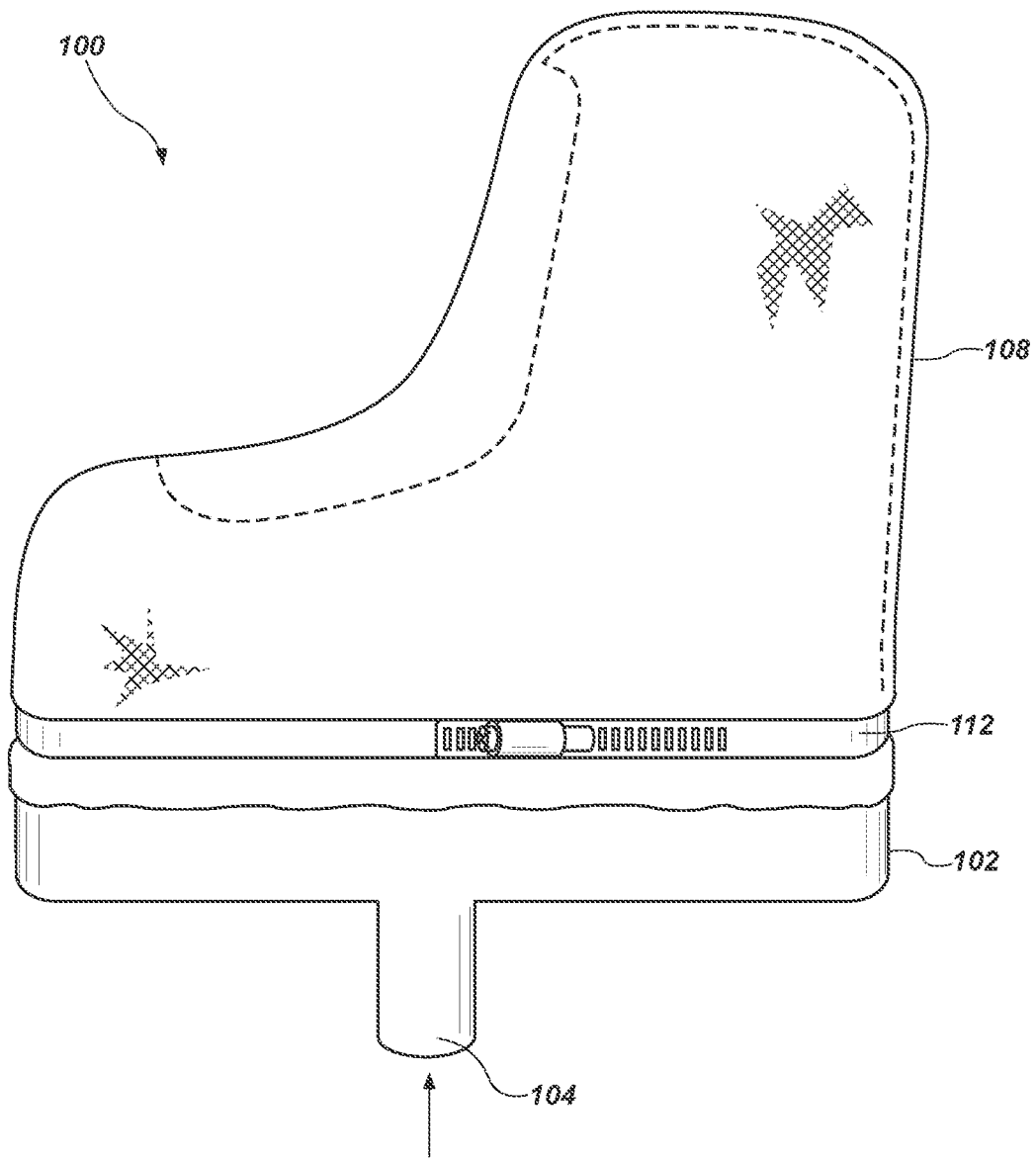
FIG. 1C illustrates the lamination machine of FIGS. 1A and 1B with the inflatable former coupled to the tray by a collar in accordance with various embodiments.

As shown in FIG. 1C, the former 108 is coupled to the tray 102 with the tray 102 disposed in the opening 110. The former 108 is secured to the tray 102 by a collar 112.

A collar 112 may be a rigid or semi-rigid strap, cord, etc. that wraps around the former 108 (or another element) to secure the former 108 or other element to the tray 102 or other underlying feature of the lamination machine 100. The former 108 may be coupled to the tray 102 using other suitable structures such as snaps, hooks, etc.

Figure 1D:
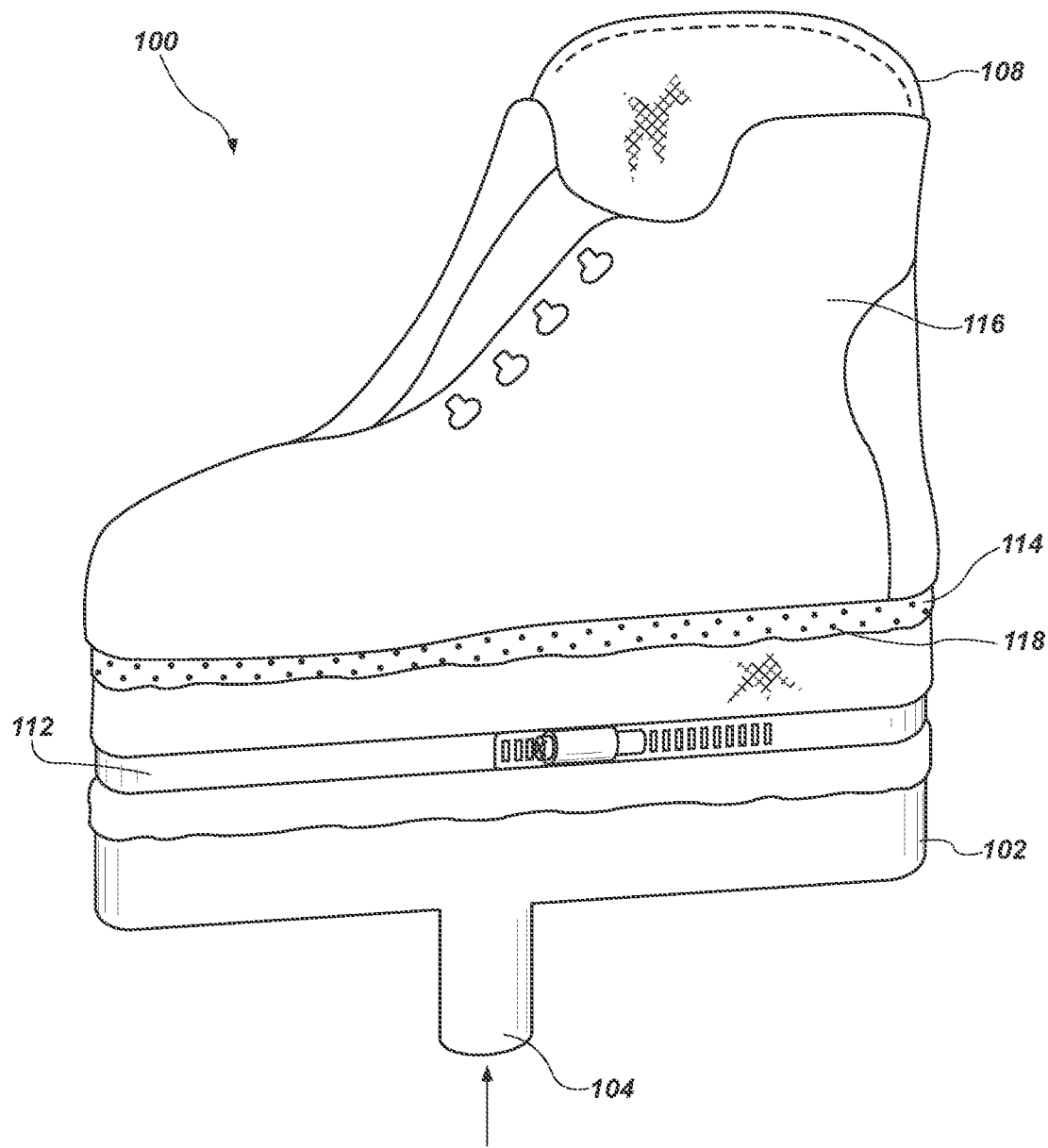
FIG. 1D illustrates the lamination machine of FIG. 1C with a membrane and a body of an article disposed on the inflatable former in accordance with various embodiments.

As shown in FIG. 1D, a membrane 114 and a body 116 of an article may be placed over the former 108. The membrane 114 may be, for example, a waterproof breathable membrane. The membrane 114 may be disposed against a target surface of the body 116. The body 116 shown in FIG. 1D is an upper of a shoe, and the target surface is the inner surface of the upper.

An adhesive 118 is disposed on the membrane 114 (e.g., between the membrane 114 and the body 116. The adhesive may be a heat-activated adhesive.

In various embodiments, the membrane 114 may have a 3D shape that corresponds to a shape of the target surface of body 116. The former 108 may also have a shape (e.g., when inflated) that corresponds to the shape of the target surface of body 116. In embodiments, the shape of the former 108 may be larger than the shape of the target surface, before and/or after inflation, to apply pressure to the membrane 114 against the target surface when the former is inflated.

With the body 116 and membrane 114 disposed on the former 108 as shown in FIG. 1D, heated gas (e.g., air) may be pumped into the former via the inlet 104 (e.g., by a pump, not shown). The heated gas may inflate the former 108 to apply pressure to press the membrane 114 against the body 116. Additionally, the heated gas may heat the adhesive 118 to activate the adhesive 118.

As discussed above, after the heated gas is pumped into the former 108 for a heating time period, cold gas may be pumped into the former 108 for a cooling time period. The cold gas may cool the adhesive to cause the adhesive to solidify and cure, thereby bonding the membrane 114 to the target surface of the body 116. After the cooling time period, the pump may stop pumping air into the former 108, allowing the former 108 to deflate. In some embodiments, a vacuum may remove gas from the former 108. The body 116 (with membrane 114 adhered to the body 116) may then be removed from the lamination machine 100.

Figure 1E:
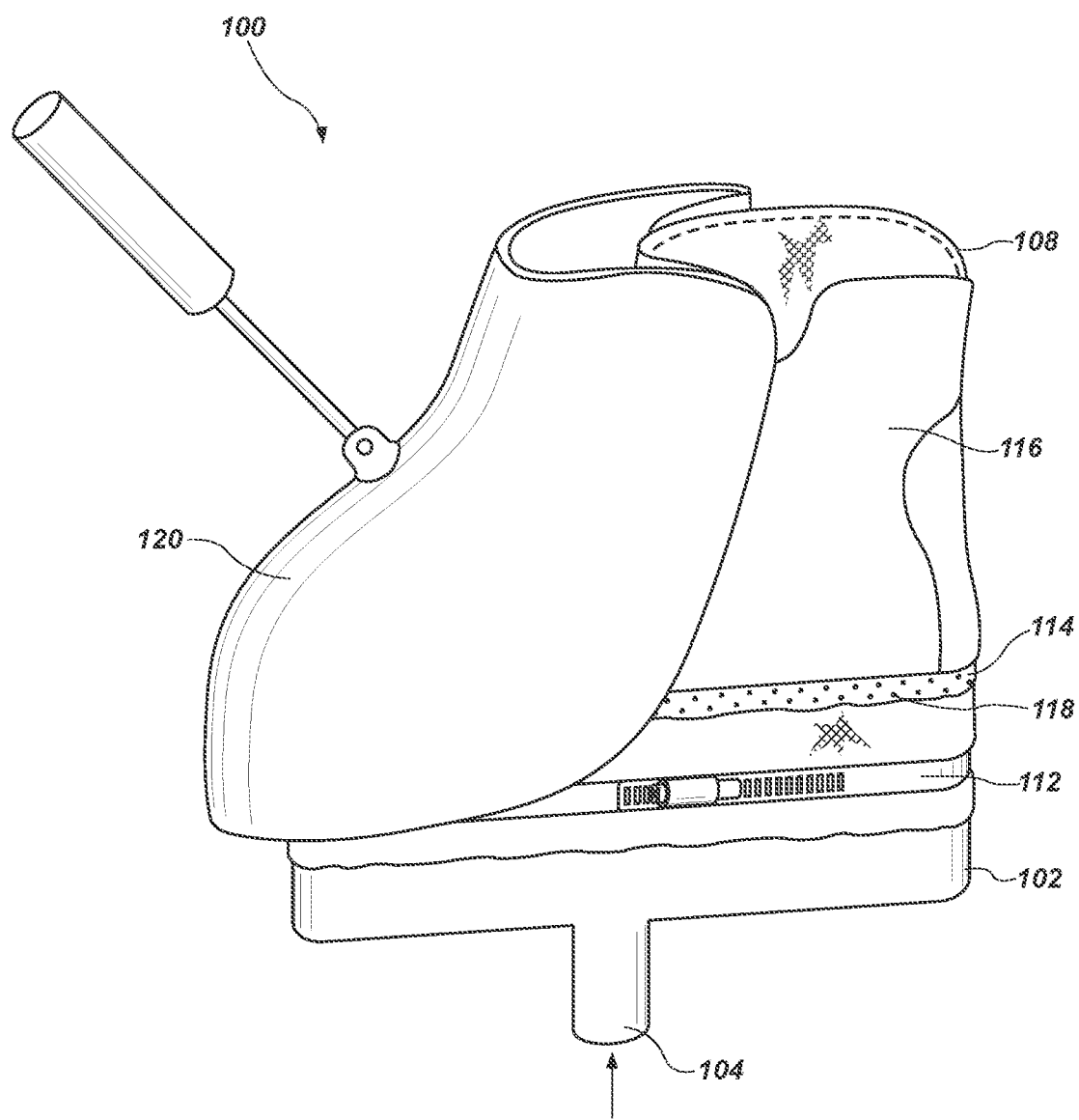
FIG. 1E illustrates the lamination machine of FIG. 1D with a shell in accordance with various embodiments.

In some embodiments, the lamination machine 100 may further include an outer cover 120, such as the rigid shell shown in FIG. 1E. The outer cover 120 is disposed adjacent the body 116. The outer cover 120 has an inner surface with a shape that generally corresponds to the shape of the outer surface of the body 116. The outer cover 120 may prevent the article from expanding significantly from the gas that is pumped into the former. The outer cover 120 may cover at least a portion of the outer surface of the body 116. For example, the shell 120 shown in FIG. 1E covers a front portion of the body 116. In some embodiments, another piece (not shown) of the outer cover 120 may cover a rear portion of the body 116. In some embodiments, the shell may include one or more openings (not shown) to allow passage of the pumped gas through the shell.

Figure 2A:
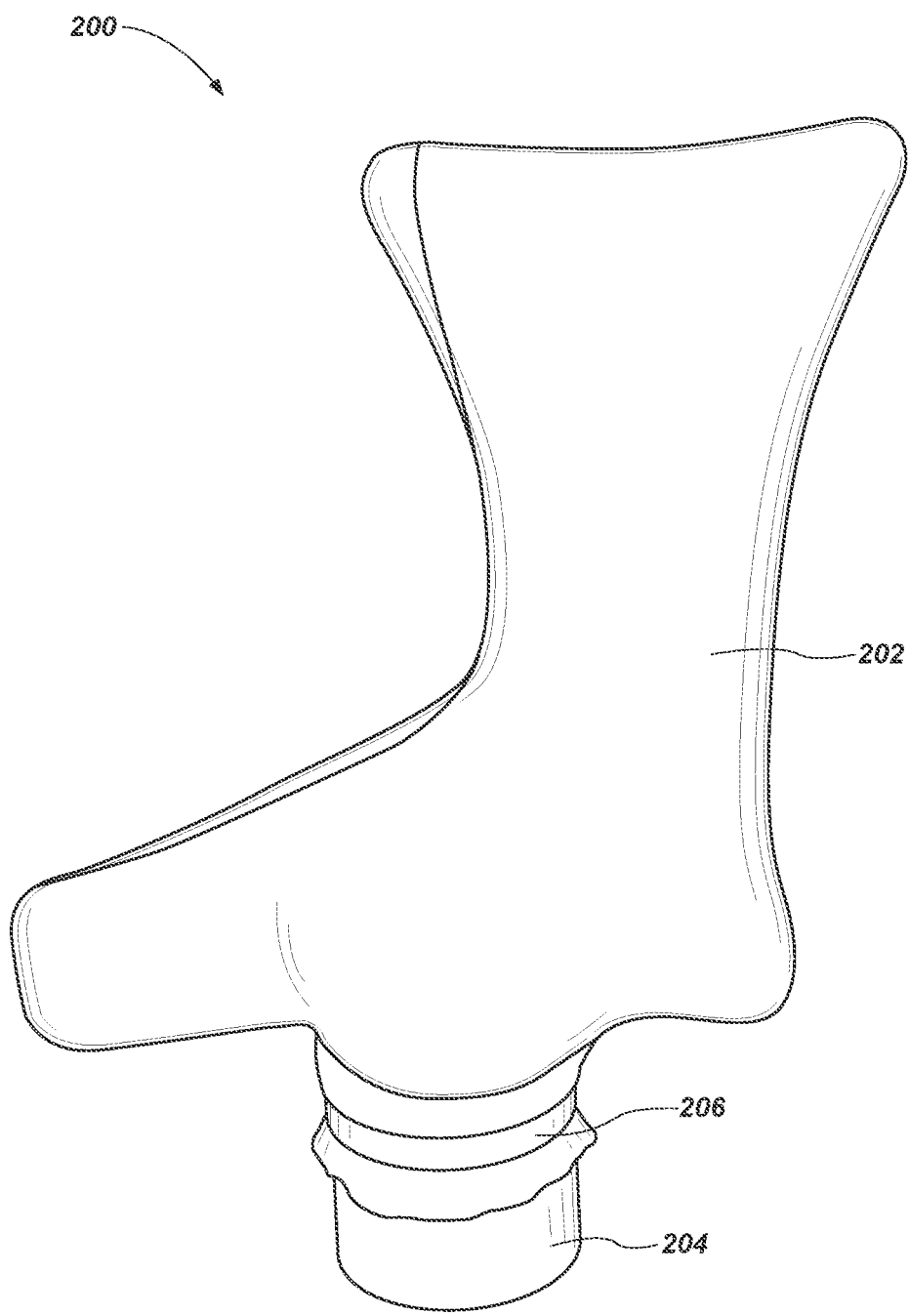
FIG. 2A illustrates a lamination machine including an inflatable former in an inflated state in accordance with various embodiments.

FIG. 2A illustrates a lamination machine 200 including an inflatable former 202 coupled to a support tray 204 by a collar 206. The inflatable former 202 is shown in an inflated state. The inflatable former 202 has a shape that generally corresponds to an inner surface of a footwear article (e.g., a boot).

Figure 2B:
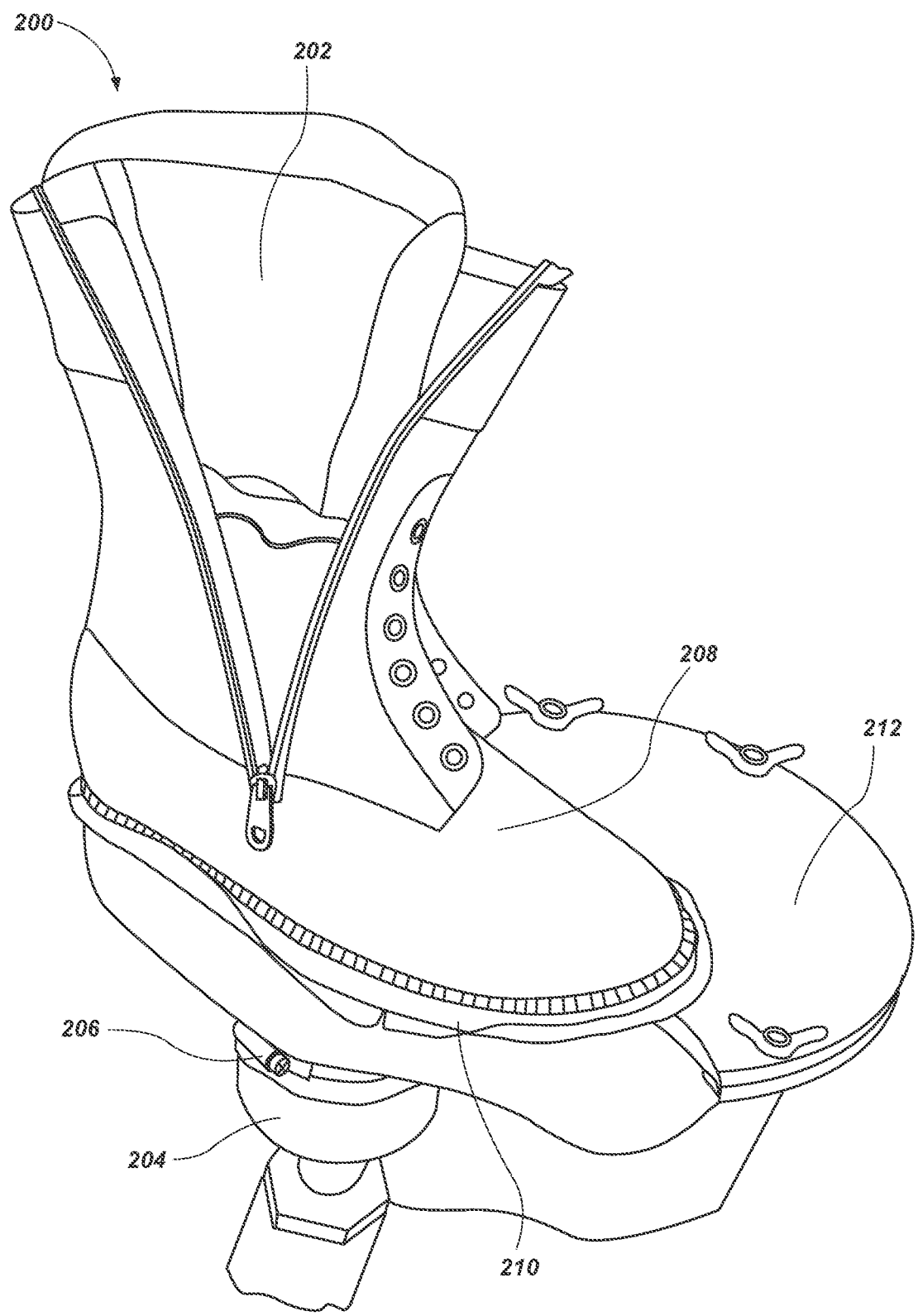
FIG. 2B illustrates the lamination machine of FIG. 2A with the inflatable former in an uninflated state and with a footwear upper and a membrane arranged on the inflatable former.

FIG. 2B illustrates the lamination machine 200 of FIG. 2A with a footwear upper 208 and a membrane 210 arranged on the inflatable former 202. The inflatable former 202 is shown in an uninflated state. The membrane 210 is arranged between the footwear upper 208 and the inflatable former 202, aligned with a target surface (e.g., the inner surface) of the footwear upper 208. FIG. 2B further shows a pump 212 to provide the compressed gas to be pumped into the former 202.

Figure 2C:
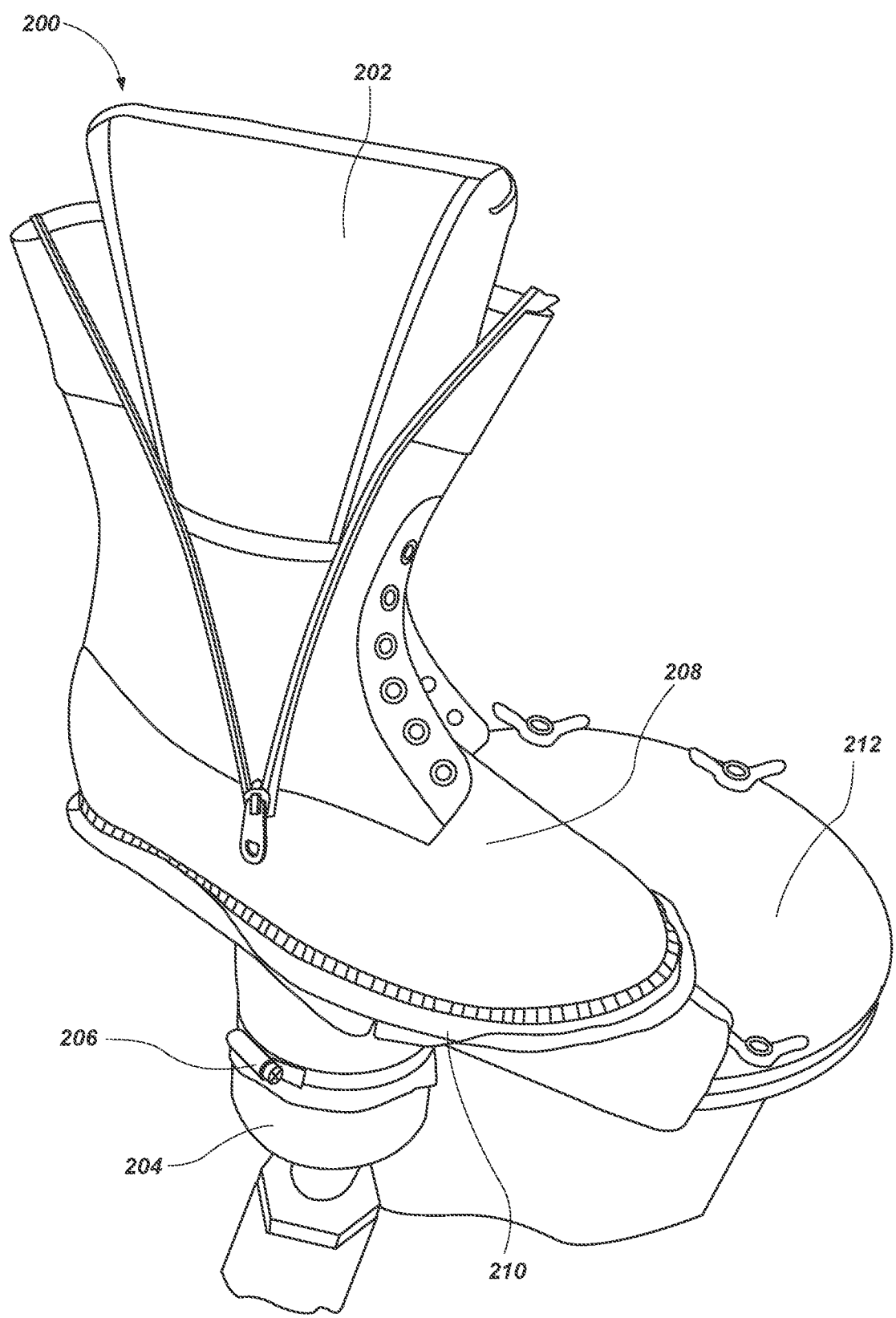
FIG. 2C illustrates the lamination machine of FIGS. 2A and 2B with the inflatable former inflated to press the membrane against the footwear upper.

FIG. 2C illustrates the lamination machine 200 of FIGS. 2A-2B, with the inflatable former 202 inflated to press the membrane 210 against the footwear upper 208. As discussed above, the inflatable former 202 may be inflated by heated compressed gas to activate a heat-activated adhesive disposed between the membrane 210 and the footwear upper 208. The inflatable former 202 may be permeable to the compressed gas to allow some of the compressed gas to pass through the inflatable former 202 to activate the adhesive.

Figure 3:
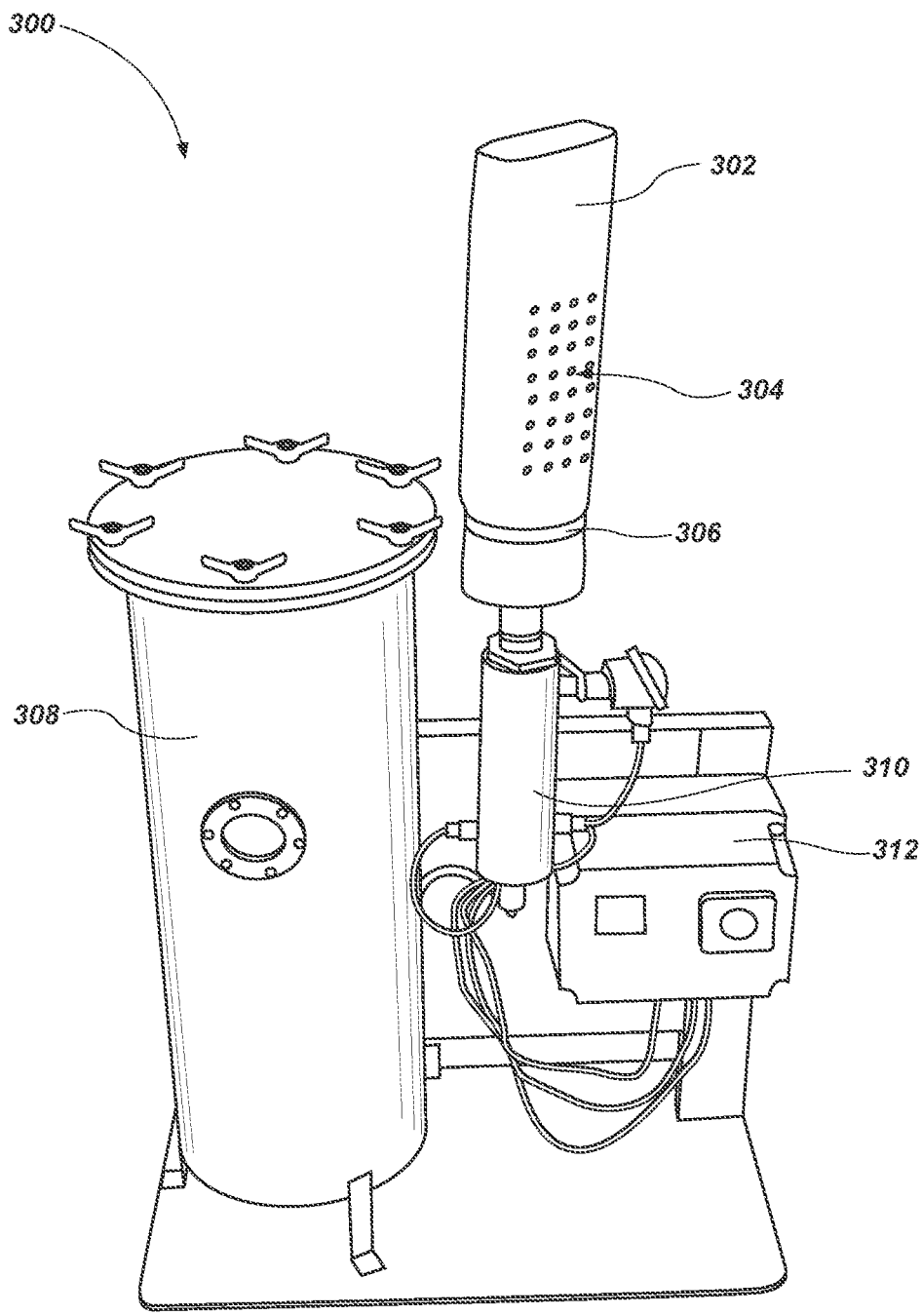
FIG. 3 illustrates another lamination machine in accordance with various embodiments.

FIG. 3 illustrates another lamination machine 300 in accordance with various embodiments. Lamination machine 300 includes an inflatable former 302 with a substantially cylindrical shape. The inflatable former 302 may be permeable to gas (e.g., air). The inflatable former 302 further includes a plurality of perforations 304 to allow the passage of gas. As shown, perforations 304 are located in a specified region of inflatable former 302. A support tray (not shown) is disposed in an opening in the inflatable former 302, and the inflatable former 302 is secured to the support tray by a collar 306.

A pump 308 is coupled to the support tray via a tube 310 to pump compressed air into the inflatable former 302. A control box 312 is coupled to the pump 308 to control the pump 308. For example, the control box 312 may control the amount, duration, and temperature of the compressed air that is pumped into the inflatable former 302.

In some embodiments, the control box 312 may be programmed to perform a pre-determined lamination process. For example, the control box 312 may pump heated gas into the inflatable former 302 for a heating time period, and then pump cold gas into the inflatable former 302 for a cooling time period. The control box 312 may additionally or alternatively include controls to manually adjust/control the parameters of the pumping performed by the pump 308.

Figure 4A:
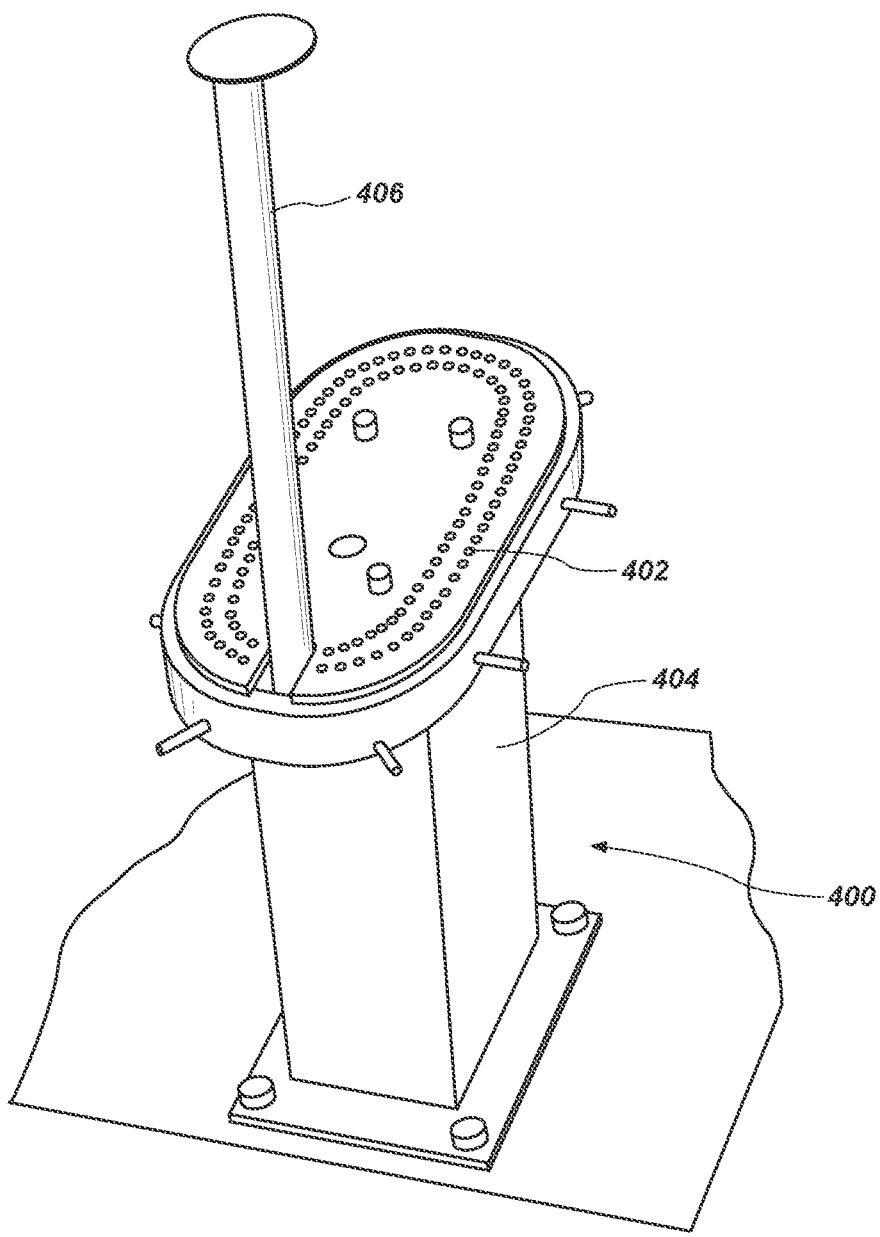
FIG. 4A illustrates another lamination machine in accordance with various embodiments.
Figure 4B:
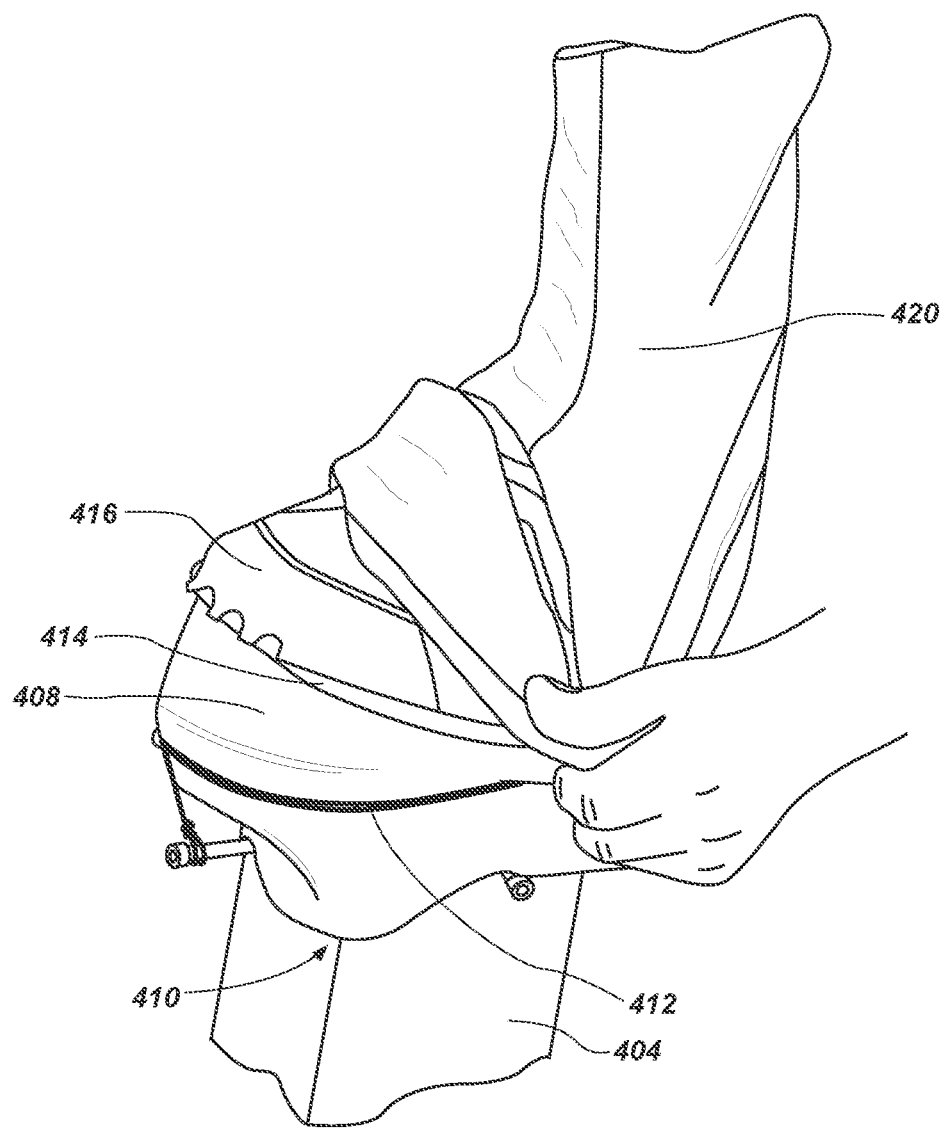
FIG. 4B illustrates the lamination machine of FIG. 4A with a membrane, a body of an article, and an outer cover disposed on the inflatable former in accordance with various embodiments.

FIGS. 4A-4B illustrate a lamination machine 400 including a tray 402 with an inlet 404 in accordance with various embodiments. Inlet 404 may be coupled to a pump (e.g., by a tube) to receive compressed gas (e.g., air). The tray 402 may be made of any suitable material, such as aluminum and/or steel.

The lamination machine 400 further includes a frame 406 coupled to the tray 402. The frame 406 may be rigid, and may be made of any suitable material, such as steel and/or rigid wire. The frame 406 may provide support to a former, membrane, and/or body of an article, as discussed further below.

The lamination machine 400 may include an inflatable former 408 with an opening 410. The former 408 may be made of a material that is permeable to air. In some embodiments, the former 408 may further include one or more perforations (not shown) to let air to pass through.

The former 408 is coupled to the tray 402 with the tray 402 disposed in the opening 410. The former 408 is secured to the tray 402 by a collar 412.

A membrane 414 and a body 416 of an article may be placed over the former 408. The membrane 414 may be, for example, a waterproof breathable membrane. The membrane 414 may be disposed against a target surface of the body 416.

With the body 416 and membrane 414 disposed on the former 408, heated gas (e.g., air) may be pumped into the former via the inlet 404. The heated gas may inflate the former 408 to apply pressure to press the membrane 414 against the body 416. Additionally, the heated gas may heat an adhesive on the membrane to activate the adhesive.

As shown in FIG. 4B, the lamination machine 400 further includes an outer cover 420, made of a pliable material, shown in FIG. 4B as a fabric bag. The outer cover 420 is disposed adjacent the body 416. The outer cover 420 has an inner surface with a shape that generally corresponds to the shape of the outer surface of the body 416. The outer cover 420 may prevent the article from expanding significantly from the gas that is pumped into the former.

Example(s)

In an example, a shoe upper was laminated with a semipermeable membrane (provided with hot-melt adhesive dots) as described herein. The air temperature injected in the inflatable former (and partially free to flow through holes in its surface) was 130 degrees Celsius and the air supply was able to maintain a pressure of about 80 KPa (0.81 bar) inside the inflatable former.

After cooling, the strength of adhesion between the membrane and the adjacent layer (upper material of the shoe) was measured according to ISO 2411:2000, in different areas of the upper, identified by an angle measured from the tray base to the examined point on the upper (10, 45, and 90 degrees to the upper top). The delamination strength value was constant with (rounded) values of 15 N/50 mm, meaning that the stated force was insufficient to delaminate the sample. The results illustrate that the present described method obtains uniform adhesion strength between membrane and upper material across the entire surface of the membrane. The results also indicate that, in embodiments, articles constructed in accordance with the present teachings have a delamination strength value of at least 15 N/50 mm.

With other processes and/or other kinds of presses (e.g. pressing from the outside of the article with deformable plates), where it is not possible to achieve uniformity of pressure, the strength of adhesion is inconsistent and may vary from high values (in regions where the pressure is high) to low (in regions where the pressure is low or even zero).

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways. This application is intended to cover any adaptations or variations of the embodiments discussed herein. Therefore, it is manifestly intended that embodiments be limited only by the claims and the equivalents thereof.

What is claimed is:

1. A lamination machine comprising:
   a pump:
   an inflatable former having an opening, the inflatable former to be inflated by gas provided by the pump through the opening to adhere a membrane to a three-dimensional target surface of an article, wherein the inflatable former includes a plurality of perforations in an outermost surface of the inflatable former and providing permeability to the gas, wherein the plurality of perforations each have a diameter of 0.1 mm to 1.0 mm; and
   an outer cover to be placed external to and surrounding the article after the article is placed on the inflatable former, wherein the outer cover is a pliable material comprising a non-stretchable fabric,
   wherein the pump and the former are configured to maintain pressure inside the former at a pressure of 60-100 KPa when the gas is pumped into the former.

2. The lamination machine of claim 1, further comprising a tray including an inlet to receive gas wherein the tray is coupled with the former.

3. The lamination machine of claim 2, further comprising a rigid frame coupled to the tray to support the membrane and the article when the inflatable former is in an uninflated state.

4. The lamination machine of claim 2, further comprising a collar to secure the inflatable former to the tray.

5. The lamination machine of claim 1, wherein the pump is configured to pump the gas into the inflatable former for a first time period.

6. The lamination machine of claim 1, wherein the pump is configured to pump heated gas into the inflatable former for a heating time period.

7. The lamination machine of claim 6, wherein the pump is further configured to pump cold gas into the inflatable former for a cooling time period after the heating time period.

8. The lamination machine of claim 7, wherein the pump is further configured to vacuum the gas out of the inflatable former after the cooling time period.

9. The lamination machine of claim 1, wherein the plurality of perforations are located in specific regions of the inflatable former, but not located in other regions of the inflatable former.

10. The lamination machine of claim 1, wherein the former has a permeability to the gas of 5 to 80 mm/sec.

11. The lamination machine of claim 1, wherein the former comprises a fabric or silicone.

12. The lamination machine of claim 1, wherein the outer cover has an inner surface that corresponds to a shape of an outer surface of the article.

* * * * *